(12) United States Patent  
Chen et al.

(10) Patent No.: US 9,229,295 B2  
(45) Date of Patent: Jan. 5, 2016

(54) IMAGE STABILIZER AND IMAGE-SHAKE CORRECTING METHOD

(71) Applicants: Yu-Han Chen, New Taipei (TW); Ho-Kai Liang, New Taipei (TW)

(72) Inventors: Yu-Han Chen, New Taipei (TW); Ho-Kai Liang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 460 days.

(21) Appl. No.: 13/664,446

(22) Filed: Oct. 31, 2012

(65) Prior Publication Data

US 2014/0016200 A1    Jan. 16, 2014

(30) Foreign Application Priority Data

Jul. 13, 2012 (TW) .............................. 101125403 A

(51) Int. Cl.
 *G02B 27/64* (2006.01)
 *G03B 5/00* (2006.01)

(52) U.S. Cl.
 CPC ............... *G03B 5/00* (2013.01); *G02B 27/646* (2013.01); *G03B 2205/0007* (2013.01); *G03B 2217/005* (2013.01)

(58) Field of Classification Search
 CPC ........ G02B 27/64; G02B 27/646; G03B 5/00; G03B 17/00; G03B 13/34
 USPC .................. 359/554–557, 813–814, 823–824
 See application file for complete search history.

(56) References Cited

U.S. PATENT DOCUMENTS

| | | | |
|---|---|---|---|
| 7,057,645 B1* | 6/2006 | Hara et al. ................. | 348/208.6 |
| 2008/0152332 A1* | 6/2008 | Koo et al. ........................ | 396/55 |
| 2010/0172639 A1* | 7/2010 | Ohishi ............................ | 396/55 |
| 2011/0261252 A1* | 10/2011 | Chen ............................. | 348/349 |
| 2011/0273572 A1* | 11/2011 | Tsuchida .................... | 348/208.4 |
| 2012/0154615 A1* | 6/2012 | Noguchi .................... | 348/208.6 |

* cited by examiner

*Primary Examiner* — Thong Nguyen  
(74) *Attorney, Agent, or Firm* — Novak Druce Connolly Bove + Quigg LLP

(57) ABSTRACT

An exemplary image stabilizer includes a shaking sensor, a control module, a driving module, an image module, and a data adjusting module. The shaking sensor detects a shake of a lens associated with the image stabilizer. The control module stores a shake correcting setting having one or more error ranges. The driving module is controlled by the control module to move the lens according to the shake correcting setting. The image module captures an image through the corrected lens. The data adjusting module adjusts the shake correcting setting within one or more of the error ranges when a resolution value of the captured image is lower than a preset reference value.

9 Claims, 2 Drawing Sheets

IMAGE STABILIZER AND IMAGE-SHAKE CORRECTING METHOD

BACKGROUND

1. Technical Field

The present disclosure relates to image capturing and image-shake correcting technologies, and particularly to an image stabilizer and an image-shake correcting method.

2. Description of Related Art

Image stabilizers generally include a sensor fixed to a lens and a driving module configured for driving the lens to move to compensate for shaking of a camera during exposure according to signals outputted from the sensor. To ensure sensitivity and accuracy of the sensor, the sensor is typically complicated and of high precision, thus increasing the cost of the image stabilizer.

Therefore, it is desirable to provide an image stabilizer and a related method which can overcome the limitations described.

DETAILED DESCRIPTION

Embodiments of the disclosure will be described with reference to the drawings.

In general, the word "module," as used herein, refers to logic embodied in hardware or firmware, or to a collection of software instructions, written in a programming language such as Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media include compact discs (CDs), digital versatile discs (DVDs), Blu-Ray disks, Flash storing systems, and hard disk drives.

Figure 1:
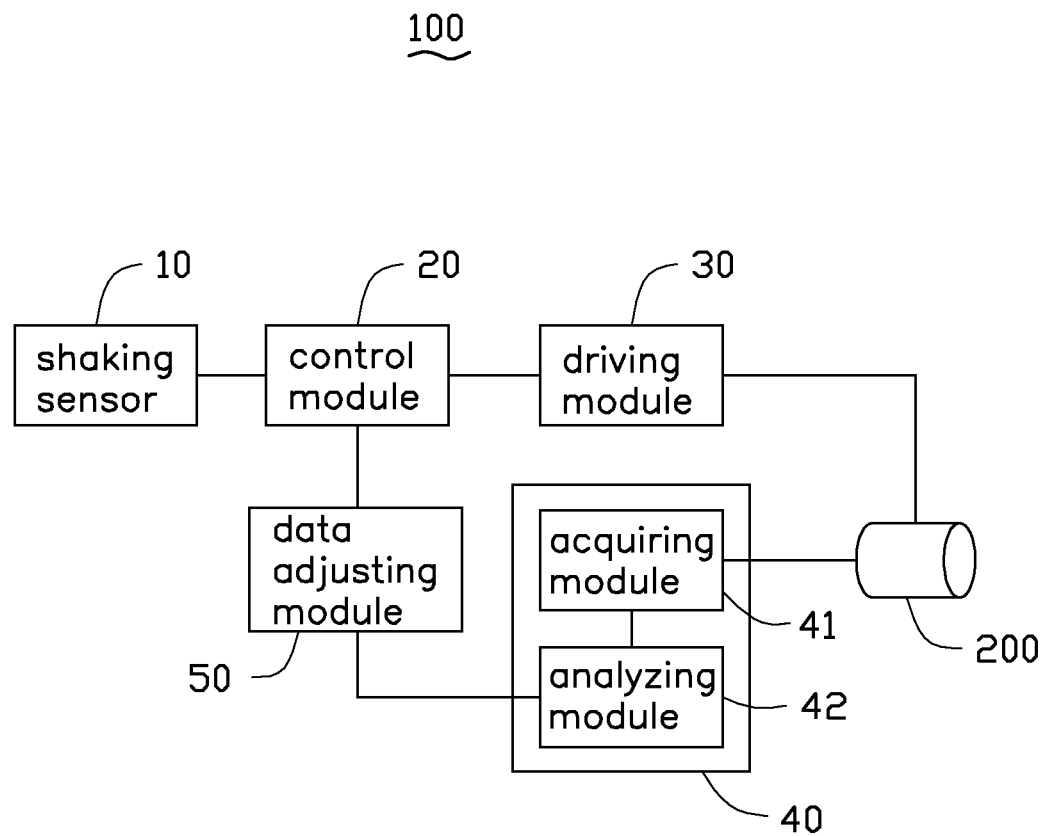
FIG. 1 is a functional block diagram of an image stabilizer in accordance with an exemplary embodiment.

Referring to FIG. 1, an image stabilizer 100, according to an exemplary embodiment, is configured for compensating for shaking of a lens 200 during exposure. The image stabilizer 100 includes a shaking sensor 10, a control module 20, a driving module 30, an image module 40, and a data adjusting module 50.

The shaking sensor 10 is configured for detecting a shake of the lens 200 and outputting a shaking signal according to the shake. In the embodiment, the shaking sensor 10 is a gyroscope. The shaking sensor 10 and the lens 200 are assembled in an electrical device (e.g., a camera or a cell phone with a camera module, not shown) that uses the image stabilizer 100. The shaking sensor 10 and the lens 200 are physically separate from each other. The shaking sensor 10 is also used to detect a rotation angle of the electrical device, and images displayed on a screen of the electrical device are rotated according the rotation angle detected by the shaking sensor 10.

The control module 20 is electrically connected to the shaking sensor 10, and receives the shaking signal. A shake correcting setting is stored in the control module 20, and the shake correcting setting is composed of an X-axis datum, a Y-axis datum, and a Z-axis datum, such as (1, 1, −2) respectively. The unit of each datum is millimeters (mm) Each datum of the shake correcting setting has an error range, such as ±0.1 mm. Generally, when a user presses a button of the electrical device to capture an image and while pressing the button shakes the electrical device, the amount and the direction of the shake remain unchanged. The shake correcting setting stored in the control module 20 can be used to effectively correct the shake of the lens 200. Also, when the environment is changed, the lens 200 can be compensated by the shake correcting setting (see below).

The driving module 30 is electrically connected to the control module 20, and is physically coupled to the lens 200. The driving module 30 drives the lens 200 to move according to the shake correcting setting output from the control module 20. In the embodiment, the driving module 30 includes a motor and a gear group connected to the motor. The motor is electrically connected to the control module 20, and the gear group is physically coupled to the lens 200.

The image module 40 includes a capturing module 41, and an analyzing module 42 connected to the capturing module 41. The capturing module 41 converts the light rays penetrating the lens 200 into image signals, and thus captures an image. The analyzing module 42 analyzes the image captured by the capturing module 41, and compares a resolution value of the image with a preset reference value, such as 800. The analyzing module 42 outputs different controlling signals according to a result of the comparison. In the embodiment, the capturing module 41 is a complementary metal-oxide semiconductor sensor. When the actual resolution value, such as 810, is greater than or equal to the preset reference value, the analyzing module 42 outputs a first controlling signal. When the actual resolution value, such as 750, is lower than the preset reference value, the analyzing module 42 outputs a second controlling signal.

The data adjusting module 50 is connected between the control module 20 and the analyzing module 42. The data adjusting module 50 pre-stores an adjusting manner of the X-axis datum, then the Y-axis datum, and lastly the Z-axis datum. The adjusting manner is typically a protocol. For example, the adjusting protocol may include the following sequential steps carried out if and as needed: adjust the X-axis datum by gradually increasing or decreasing the X-axis datum within the corresponding error range, then adjust the Y-axis datum by gradually increasing or decreasing the Y-axis datum within the corresponding error range, then adjust the Z-axis datum by gradually increasing or decreasing the Z-axis datum within the corresponding error range, until the resolution value of another image captured by the capturing module 41 is less than the preset reference value. It should be understood that in other examples, the data adjusting module 50 can adjust the X-axis datum, the Y-axis datum, and the Z-axis datum according to other adjusting protocols.

In use of the image stabilizer 100, the user presses the button of the electrical device to capture the image. The shaking sensor 10 detects a shake of the electrical device, and outputs a shaking signal to the control module 20. The control module 20 outputs the shake correcting setting to the driving module 30. The driving module 30 drives the lens 200 to move according to the shake correcting setting. The capturing module 41 captures the image through the lens 200 after the lens 200 is corrected. The analyzing module 42 analyzes the image captured by the capturing module 41, and compares the resolution value of the image with the preset reference value. If the analyzing module 42 outputs the first controlling signal to the data adjusting module 50, the control module 20 stores the image captured by the capturing module 41. On the other hand, if the analyzing module 42 outputs the second controlling signal to the data adjusting module 50, the data adjusting module 50 adjusts the shake correcting setting within one or more of the error ranges according to the adjusting protocol. Then the driving module 30 drives the lens 200 to move according to the adjusted shake correcting setting. Then the capturing module 41 captures the image through the lens 200 after the lens 200 is corrected.

Figure 2:
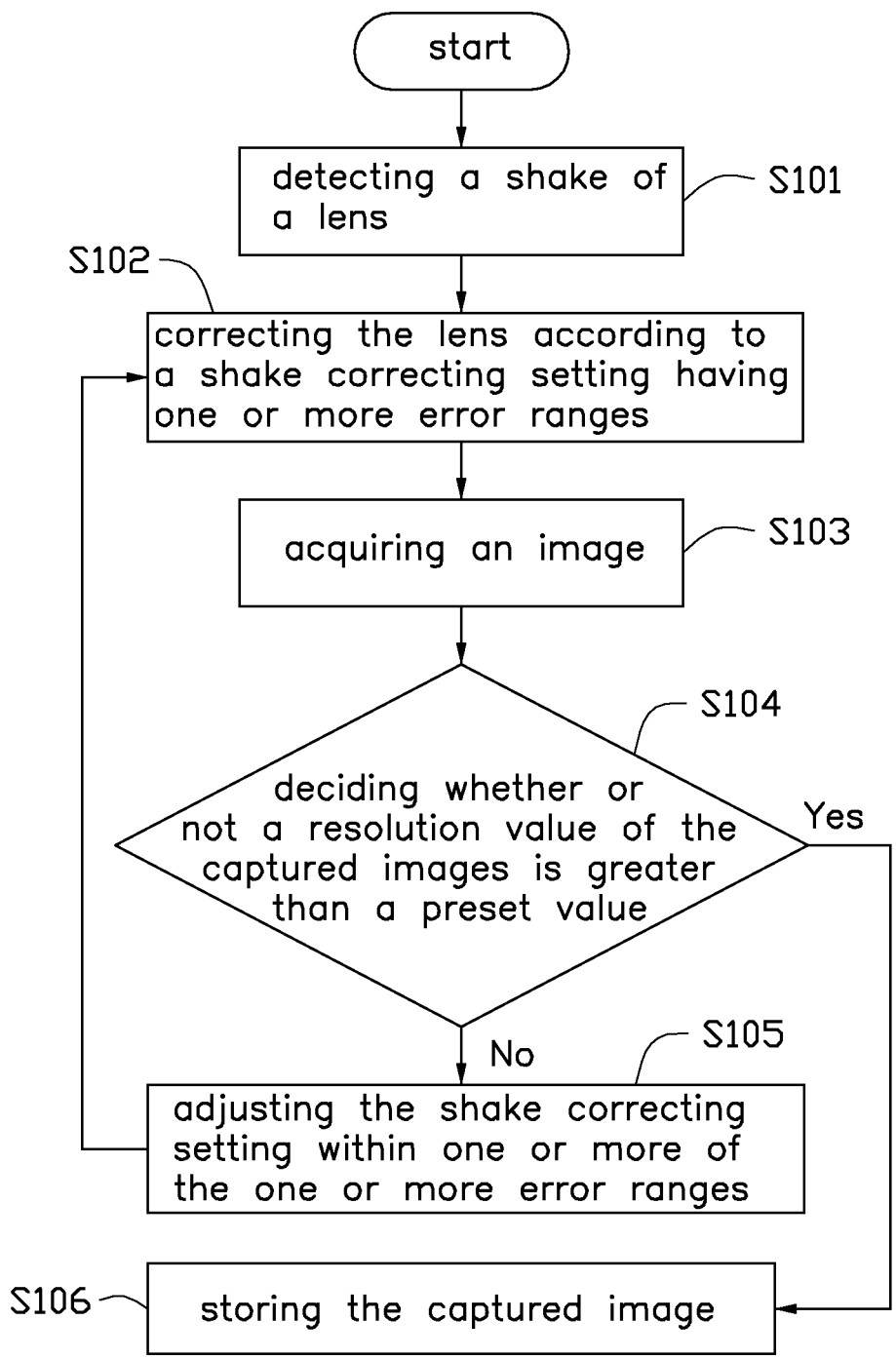
FIG. 2 is a flowchart of an image-shake correcting method in accordance with an exemplary embodiment.

Referring to FIG. 2, an image-shake correcting method, according to an exemplary embodiment, is used in the electrical device. The image-shake correcting method includes steps S101-S106.

S101: detecting a shake of the lens 200.

S102: correcting the lens 200 according to a shake correcting setting having one or more error ranges. In the above-described embodiment, the shake correcting setting is composed of the X-axis datum, the Y-axis datum, and the Z-axis datum. Each datum of the shake correcting setting has an error range, therefore there is a total of three error ranges.

S103: capturing an image through the lens 200 after the lens 200 is corrected.

S104: deciding whether or not a resolution value of the captured image is greater than a preset reference value.

S105: when the resolution value is lower than the preset reference value, the shake correcting setting is adjusted within one or more of the one or more error ranges. In the above-described embodiment, one or more of the X-axis datum, the Y-axis datum and the Z-axis datum is adjusted within the corresponding error range according to the adjusting protocol. Then the procedure returns to step S102.

S106: when the resolution value is greater than the preset reference value, the captured image is stored.

Particular embodiments are shown and described by way of illustration only. The principles and the features of the present disclosure may be employed in various and numerous embodiments without departing from the scope of the claimed invention. The above-described embodiments illustrate the scope of the disclosure but do not restrict the scope of the disclosure.

What is claimed is:

1. An image stabilizer, comprising:
a shaking sensor detecting a shake of a lens associated with the image stabilizer;
a control module storing a shake correcting setting having one or more adjustable error ranges, and electrically connected to the shaking sensor;
a driving module electrically connected to the control module and physically coupled to the lens, wherein the driving module is controlled by the control module to move the lens according to the shake correcting setting and thereby correcting a position of the lens;
an image module capturing an image through the lens; and
a data adjusting module electrically connected between the control module and the image module, and adjusting the shake correcting setting within one or more of the one or more adjustable error ranges when a resolution value of the captured image is lower than a preset reference value;
wherein the control module further controls the driving module to move the lens according to an adjusted shake correcting setting adjusted by the data adjusting module, and thereby further correcting the position of the lens.

2. The image stabilizer of claim 1, wherein the shaking sensor and the lens are physically separate from each other.

3. The image stabilizer of claim 1, wherein the image module comprises a capturing module and an analyzing module connected to the capturing module; the capturing module converts light rays penetrating the lens to image signals, and captures an image; and the analyzing module analyzes the image captured by the capturing module, and compares the resolution value of the image with the preset reference value.

4. The image stabilizer of claim 3, wherein when the resolution value is greater than or equal to the preset reference value, the analyzing module outputs a first controlling signal to the data adjusting module, and the control module stores the image captured by the capturing module.

5. The image stabilizer of claim 3, wherein when the resolution value is lower than the preset reference value, the analyzing module outputs a second controlling signal to the data adjusting module, and the data adjusting module adjusts the shake correcting setting.

6. The image stabilizer of claim 5, wherein the shake correcting setting comprises an X-axis datum, a Y-axis datum, and a Z-axis datum, and the one or more error ranges are three error ranges, which are an X-axis datum error range, a Y-axis datum error range, and a Z-axis datum error range.

7. An image-shake correcting method, comprising:
detecting a shake of a lens;
correcting a position of the lens according to an adjustable shake correcting setting or a pre-stored shake correcting setting having one or more adjustable error ranges;
capturing an image through the lens after the position of the lens is corrected;
deciding whether or not a resolution value of the captured image is greater than or equal to a preset reference value; and
when the resolution value is lower than the preset reference value, adjusting the pre-stored shake correcting setting within one or more of the one or more adjustable error ranges.

8. The image-shake correcting method of claim 7, further comprising, when the resolution value is greater than the preset reference value, storing the captured image.

9. The image-shake correcting method of claim 7, further comprising, after the pre-stored shake correcting setting is adjusted, correcting the position of the lens according to the adjusted shake correcting setting, and again capturing an image through the lens.

* * * * *